(12) United States Patent
Kitahata et al.

(10) Patent No.: US 9,944,278 B2
(45) Date of Patent: Apr. 17, 2018

(54) VEHICLE

(71) Applicant: TOYOTA JIDOSHA KABUSHIKI KAISHA, Toyota-shi, Aichi-ken (JP)

(72) Inventors: Takeshi Kitahata, Toyota (JP); Tooru Matsubara, Toyota (JP); Kazuyuki Shiiba, Miyoshi (JP); Shunya Kato, Seto (JP); Kenji Uchida, Nagoya (JP); Mitsuru Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 15/234,507

(22) Filed: Aug. 11, 2016

(65) Prior Publication Data

US 2017/0050635 A1 Feb. 23, 2017

(30) Foreign Application Priority Data

Aug. 18, 2015 (JP) .................. 2015-160996

(51) Int. Cl.
*B60W 20/40* (2016.01)
*B60K 6/445* (2007.10)
(Continued)

(52) U.S. Cl.
CPC ............... *B60W 20/40* (2013.01); *B60K 6/26* (2013.01); *B60K 6/445* (2013.01); *B60W 10/02* (2013.01); *B60W 10/06* (2013.01); *B60W 10/08* (2013.01); *B60W 10/12* (2013.01); *B60W 20/50* (2013.01); *B60W 30/18054* (2013.01); *B60W 30/18072* (2013.01); *B60W 50/0205* (2013.01); *F16H 3/006* (2013.01); *F16H 3/727* (2013.01); *F16H 3/728* (2013.01); *F16H 37/0826* (2013.01); *B60K 6/383* (2013.01); *B60K 6/387* (2013.01);
(Continued)

(58) Field of Classification Search
CPC ........ B60K 2006/266; B60K 2006/268; B60K 6/387; B60W 10/02; B60W 20/40
See application file for complete search history.

(56) References Cited

U.S. PATENT DOCUMENTS 6,345,216 B1 2/2002 Morimoto et al.
9,702,420 B2 * 7/2017 Yoon ....................... F16D 21/02
(Continued)

FOREIGN PATENT DOCUMENTS

JP 2001-128306 A 5/2001
JP 2009-012726 A 1/2009
(Continued)

*Primary Examiner* — Ryan Rink
(74) *Attorney, Agent, or Firm* — Oliff PLC (57) ABSTRACT

A vehicle includes an engine, a first motor generator, a second motor generator, a transmission, a differential device, and an electronic control unit. The transmission includes an input shaft, an output shaft, and a clutch. The electronic control unit is configured to detect a rotation speed difference between the input shaft and the output shaft when the clutch is controlled so as to be brought into a power transmission shut-off state. The electronic control unit is configured to, when the rotation speed difference detected by the electronic control unit is smaller than a target rotation speed difference between the input shaft and the output shaft that occurs in a case where the power transmission shut-off state of the clutch is established, suppress cranking of the engine by the first motor generator.

8 Claims, 9 Drawing Sheets

(51) Int. Cl.

| | | |
|---|---|---|
| *B60W 30/18* | (2012.01) | |
| *B60W 20/50* | (2016.01) | |
| *B60K 6/26* | (2007.10) | |
| *B60W 10/08* | (2006.01) | |
| *B60W 10/12* | (2012.01) | |
| *F16H 3/00* | (2006.01) | |
| *F16H 3/72* | (2006.01) | |
| *F16H 37/08* | (2006.01) | |
| *B60W 10/02* | (2006.01) | |
| *B60W 10/06* | (2006.01) | |
| *B60W 50/02* | (2012.01) | |
| *B60K 6/387* | (2007.10) | |
| *F16H 61/12* | (2010.01) | |
| *B60K 6/383* | (2007.10) | |
| *F16H 3/66* | (2006.01) | |
| *B60K 6/38* | (2007.10) | |

(52) U.S. Cl.
CPC .. *B60K 2006/266* (2013.01); *B60K 2006/268* (2013.01); *B60K 2006/381* (2013.01); *B60W 2510/081* (2013.01); *B60W 2510/104* (2013.01); *B60W 2510/1015* (2013.01); *B60W 2510/30* (2013.01); *B60W 2710/021* (2013.01); *B60W 2710/023* (2013.01); *B60W 2710/083* (2013.01); *B60W 2710/086* (2013.01); *B60W 2710/12* (2013.01); *B60Y 2300/19* (2013.01); *F16H 3/66* (2013.01); *F16H 2061/1276* (2013.01); *F16H 2200/0043* (2013.01); *F16H 2200/2007* (2013.01); *F16H 2200/2035* (2013.01); *F16H 2200/2041* (2013.01); *F16H 2200/2066* (2013.01); *F16H 2200/2082* (2013.01); *Y02T 10/6239* (2013.01); *Y02T 10/6286* (2013.01); *Y02T 10/7258* (2013.01); *Y10S 903/913* (2013.01); *Y10S 903/915* (2013.01)

(56) References Cited

U.S. PATENT DOCUMENTS

| | | | |
|---|---|---|---|
| 9,806,644 B2* | 10/2017 | Shimada | F04B 17/05 |
| 2009/0018715 A1 | 1/2009 | Kanayama | |
| 2010/0116235 A1 | 5/2010 | Imamura et al. | |
| 2013/0138282 A1 | 5/2013 | Shin et al. | |
| 2013/0150206 A1 | 6/2013 | Nissato | |
| 2014/0011632 A1 | 1/2014 | Ito et al. | |
| 2015/0217645 A1* | 8/2015 | Imamura | B60L 1/08 701/22 |
| 2015/0298681 A1* | 10/2015 | Tanaka | B60K 6/48 701/22 |
| 2015/0360672 A1* | 12/2015 | Hayashima | B60K 6/48 701/22 |
| 2016/0245203 A1* | 8/2016 | Petridis | F02D 41/022 |
| 2018/0010685 A1* | 1/2018 | Yuasa | F16H 61/12 |

FOREIGN PATENT DOCUMENTS

| | | |
|---|---|---|
| JP | 2010-115982 A | 5/2010 |
| JP | 2010-221932 A | 10/2010 |
| JP | 2012-162215 A | 8/2012 |
| JP | 2013-112335 A | 6/2013 |
| JP | 2013-123964 A | 6/2013 |
| WO | 2014/157183 A1 | 10/2014 |

\* cited by examiner

|  | C1 | C2 | B1 | B2 | F1 |
|---|---|---|---|---|---|
| 1st, R, N | ○ |  |  | ○ | △ |
| 2nd | ○ |  | ○ |  |  |
| 3rd | ○ | ○ |  |  |  |
| 4th |  | ○ | ○ |  |  |

VEHICLE

INCORPORATION BY REFERENCE

The disclosure of Japanese Patent Application No. 2015-160996 filed on Aug. 18, 2015 including the specification, drawings and abstract is incorporated herein by reference in its entirety.

BACKGROUND

1. Technical Field

The disclosure relates to control for a vehicle in which are mounted a transmission having a clutch configured to be engaged at the time of starting and to be disengaged at the time of power shut-off and a motor generator coupled to an input shaft of the transmission.

2. Description of Related Art

For example, Japanese Patent Application Publication No. 2013-112335 (JP 2013-112335 A) discloses a hybrid vehicle in which the necessity of charging of an in-vehicle battery during stoppage of the vehicle is determined, and in a case where it is determined that charging of the battery is required, a motor brings a transmission coupled to an input shaft into a power shut-off state. JP 2013-112335 A discloses a technique which, after the transmission is brought into the power shut-off state, engages a clutch provided between an engine and the motor to start the engine, generates electric power with the power of the engine, and charges the in-vehicle battery with the generated electric power.

SUMMARY

However, in a vehicle including an engine, a first motor generator, a second motor generator, and a differential device coupled with the engine, the first motor generator, and the second motor generator, in a case where the engine is started using the first motor generator in a state where a power transmission shut-off state of a transmission is not established due to transmission failure, the torque of the second motor generator is increased to provide a reaction force of the first motor generator, and thus, the increased torque may be transmitted to drive wheels through the transmission. For this reason, vibration, noise, or the like may occur in the vehicle. Meanwhile, one may consider determining whether or not the power transmission shut-off state of the transmission is established using a sensor which detects the state of a clutch, but the number of components may increase and manufacturing costs may increase.

The embodiments provide a vehicle capable of determining whether or not the power transmission shut-off state of the transmission is established with high accuracy while suppressing increases in costs.

A vehicle according to one aspect includes an engine, a first motor generator, a second motor generator, a transmission, a differential device, and an electronic control unit. The transmission includes an input shaft, an output shaft, and a clutch. The input shaft is coupled to the second motor generator. The output shaft is coupled to drive wheels of the vehicle. The clutch is configured to switch a transmission state of the input shaft with the output shaft between a power transmission state and a power transmission shut-off state. The differential device includes a first rotating element, a second rotating element, and a third rotating element. The first rotating element is coupled to the first motor generator. The second rotating element is coupled to the second motor generator. The third rotating element is coupled to an output shaft of the engine. The differential device is configured such that when rotation speeds of two rotating elements among the first rotating element, the second rotating element, and the third rotating element are determined, a rotation speed of a remaining one of the first, second and third rotating elements is determined. The electronic control unit is configured to control the first motor generator, the second motor generator, and the clutch. The electronic control unit is configured to detect a rotation speed difference between the input shaft and the output shaft when the clutch is controlled so as to be brought into the power transmission shut-off state. The electronic control unit is configured to, when the rotation speed difference detected by the electronic control unit is smaller than a target rotation speed difference between the input shaft and the output shaft that occurs in a case where the power transmission shut-off state of the clutch is established, suppress cranking of the engine by the first motor generator.

According to the vehicle of this aspect, the rotation resistance of the input shaft in a case where the power transmission shut-off state is not established becomes higher than the rotation resistance of the input shaft in a case where the power transmission shut-off state is established. For this reason, in a case where the clutch is controlled so as to be brought into the power transmission shut-off state, when the rotation speed difference is smaller than the target rotation speed difference, it can be said that the power transmission shut-off state is not established. For this reason, the cranking of the engine by the first motor generator is suppressed, whereby it is possible to suppress the occurrence of vibration or noise due to the transmission of torque of the first motor generator to the drive wheels through the transmission. It is not necessary to provide a sensor which detects the state of the clutch in order to determine whether or not the power transmission shut-off state is established with high accuracy, and thus, it is possible to minimize an increase in the number of components and increases in manufacturing costs.

In the vehicle according to the above-described aspect, the electronic control unit may be configured to, when the clutch is controlled so as to be brought into the power transmission shut-off state, control the second motor generator so as to generate torque lower than a rolling resistance of the vehicle.

According to the vehicle of this aspect, in order to determine whether or not the power transmission shut-off state is established, while operating the second motor generator, it is possible to prevent the movement of the vehicle even in a state where the power transmission shut-off state is not established.

In the vehicle according to the above-described aspect, the electronic control unit may be configured to control the second motor generator such that a rotating shaft of the second motor generator rotates after a time set according to a temperature of hydraulic oil for use in the clutch has elapsed, after the clutch starts to be controlled so as to be brought into the power transmission shut-off state.

According to the vehicle of this aspect, the rotating shaft of the second motor generator is rotated at a timing when it is estimated that the power transmission shut-off state is established, whereby it is possible to determine whether or not the power transmission shut-off state is established with high accuracy.

In the vehicle according to the above-described aspect, the electronic control unit may be configured to control the second motor generator so as to output torque such that the output shaft of the engine rotates in a positive rotation direction.

According to the vehicle of this aspect, if the output shaft of the engine is rotated in the positive rotation direction, the rotation direction of the second motor generator is in the positive rotation direction, and thus, it is possible to perform the cranking of the engine without reversely rotating the second motor generator. For this reason, it is possible to suppress the occurrence of rattling noise or the like of a gear due to the reverse rotation of the second motor generator.

In the vehicle according to the above-described aspect, the transmission may include a fourth rotating element, a fifth rotating element, and a sixth rotating element. The transmission is configured such that, when rotation speeds of two rotating elements among the fourth rotating element, the fifth rotating element, and the sixth rotating element are determined, a rotation speed of a remaining one of the fourth, fifth and sixth rotating elements is determined. The fourth rotating element may be coupled to the second motor generator through the clutch. The fifth rotating element may be coupled to the output shaft of the transmission. The sixth rotating element may be coupled with a brake which is brought into an engagement state to restrict the rotation of the sixth rotating element and a one-way clutch which restricts the rotation direction of the sixth rotating element to a single direction. The electronic control unit may be configured to, when the clutch is controlled so as to be brought into the power transmission shut-off state, control the brake so as to be brought into the engagement state.

According to the vehicle of this aspect, the brake is brought into the engagement state, whereby it is possible to prevent the calculation of the difference between the rotation speed of the input shaft and the rotation speed of the output shaft of the transmission while in a state where the one-way clutch is rotated in a rotatable direction. For this reason, it is possible to prevent erroneous detection of whether or not the power transmission shut-off state of the transmission is established.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described referring to the drawings. In the following description, the same components are represented by the same reference numerals. The names and functions of the same components are the same. Accordingly, detailed description of the same components will not be repeated.

Figure 1:
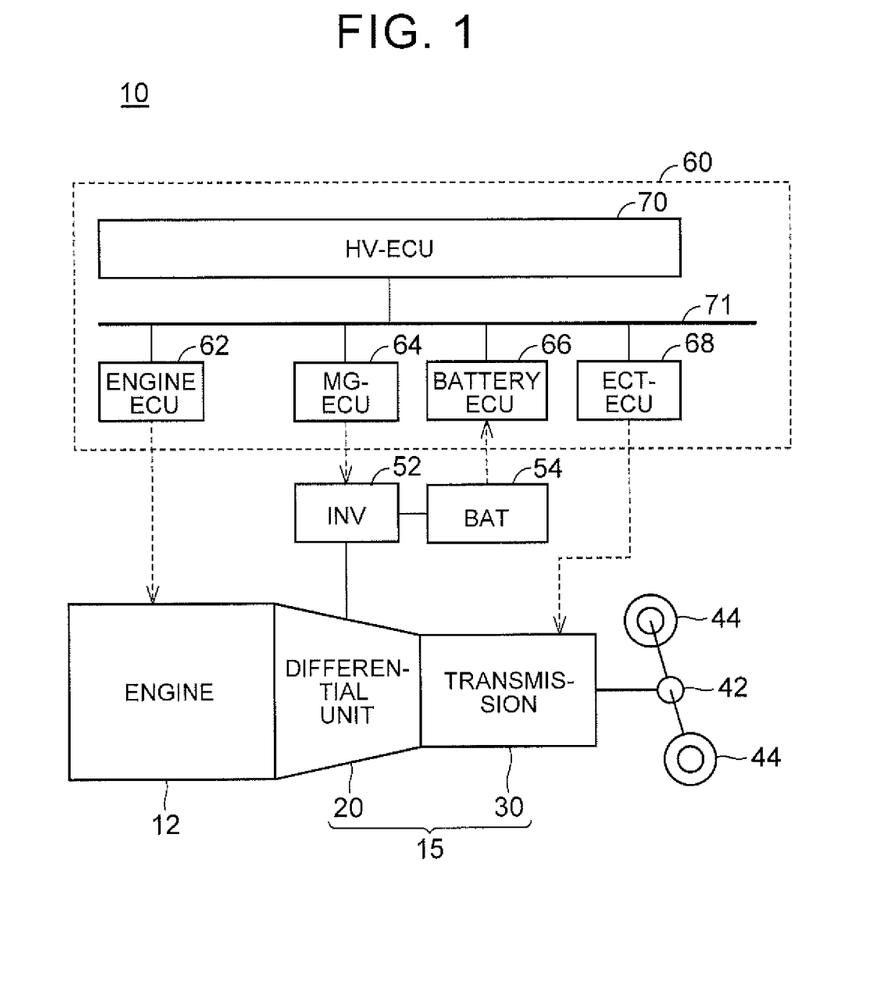
FIG. 1 is a schematic configuration diagram of a power transmission system for a vehicle and a control system thereof.

As shown in FIG. 1, a vehicle 10 includes an engine 12, a transmission unit 15, a differential gear device 42, and drive wheels 44. The transmission unit 15 includes a differential unit 20, and a transmission 30. The vehicle 10 further includes an inverter 52, a power storage device 54, and a control device 60.

The engine 12 is an internal combustion engine which converts thermal energy generated from combustion of fuel into kinetic energy of a moving body, such as a piston or a rotor, to generate power. The differential unit 20 is coupled to the engine 12. The differential unit 20 includes a motor generator which is driven by the inverter 52, and a power split device which splits the output of the engine 12 to a transmission member connected to the transmission 30 and to the motor generator. The differential unit 20 is configured to continuously change the ratio (transmission gear ratio) between the rotation speed of the output shaft of the engine 12 and the rotation speed of the transmission member connected to the transmission 30 by appropriately controlling the operation point of the motor generator, and functions as a continuously variable transmission. The detailed configuration of the differential unit 20 will be described below.

The transmission 30 is coupled to the differential unit 20 and is configured to change the ratio (transmission gear ratio) between the rotation speed of the transmission member (the input shaft of the transmission 30) connected to the differential unit 20 and the rotation speed of a drive shaft (the output shaft of the transmission 30) connected to the differential gear device 42. The transmission 30 may be an automatic transmission which allows power transmission in a predetermined mode by engaging friction engagement elements (clutches) operated by hydraulic pressure (the transmission 30 is operable), and for example, a stepped automatic transmission which can change the transmission gear ratio in a stepwise manner by engaging or disengaging a plurality of friction engagement elements (clutches or brakes) operated by hydraulic pressure in a predetermined combination, or a continuously variable automatic transmission which has a start clutch capable of continuously changing the transmission gear ratio.

The transmission gear ratio (the total transmission gear ratio between the output shaft of the engine 12 and the drive shaft) of the transmission unit 15 is determined by the transmission gear ratio of the transmission 30 and the transmission gear ratio of the differential unit 20. The detailed configuration of the transmission 30 will be described below along with the differential unit 20. The differential gear device 42 is coupled to the output shaft of the transmission 30, and transmits power output from the transmission 30 to the drive wheels 44.

The inverter 52 is controlled by the control device 60, and controls the driving of the motor generator included in the differential unit 20. The inverter 52 is constituted of, for example, a bridge circuit which includes a semiconductor switching element for electric power for three phases. Though not particularly shown, a voltage converter may be provided between the inverter 52 and the power storage device 54.

The power storage device 54 is a rechargeable DC power supply, and is constituted of a secondary battery, such as a lithium-ion battery or a nickel-hydrogen battery, for example. The power storage device 54 may be constituted of a power storage element, such as an electric double layer capacitor, instead of a secondary battery.

The electronic control unit 60 includes an engine electronic control unit (ECU) 62, an MG-ECU 64, a battery ECU 66, an ECT-ECU 68, and an HV-ECU 70. Each of the ECUs includes a central processing unit (CPU), a storage device (memory), an input/output buffer, and the like (which are not shown), and executes predetermined control. The control which is executed by each ECU is not limited to processing by software, but may be processed with dedicated hardware (electronic circuit). The respective ECUs are connected to a communication line (bus) 71, and exchange signals with one another.

The engine ECU 62 generates a control signal for driving the engine 12 based on an engine torque command and the like received from the HV-ECU 70, and outputs the generated control signal to the engine 12. The MG-ECU 64 generates a control signal for driving the inverter 52, and outputs the generated control signal to the inverter 52.

The battery ECU 66 estimates the charging state (indicated by a state of charge (SOC) value representing a current power storage amount to the fully charged state by percentage) of the power storage device 54 based on the voltage and/or the current of the power storage device 54, and outputs the estimated value to the HV-ECU 70. The ECT-ECU 68 generates a hydraulic pressure command for controlling the transmission 30 based on a torque capacity command and the like received from the HV-ECU 70, and outputs the generated hydraulic pressure command to the transmission 30.

The HV-ECU 70 receives signals of a shift lever and other sensors, and generates various commands for controlling the respective units of the vehicle 10. As the representative control which is executed by the HV-ECU 70, the HV-ECU 70 executes traveling control for controlling the engine 12 and the transmission unit 15 to achieve a desired state and allowing the vehicle to travel based on the operation amount of an accelerator pedal, the vehicle speed, and the like. The HV-ECU 70 executes gear shift control for controlling the differential unit 20 and the transmission 30 to reach a desired gear shift state based on the traveling state (accelerator opening, vehicle speed, and the like) of the vehicle, the position of the shift lever, and the like. The details of the gear shift control will be described below.

Figure 2:
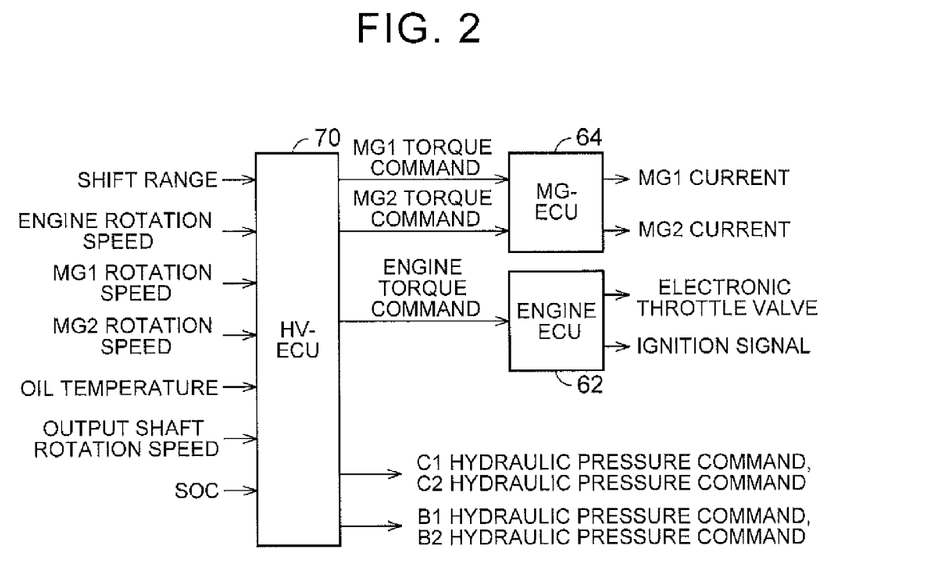
FIG. 2 is a diagram showing main signals and commands which are input and output to and from a control device.

FIG. 2 is a diagram showing main signals and commands which are input and output to and from the control device 60 shown in FIG. 1. Referring to FIG. 2, the HV-ECU 70 receives a signal from a shift range sensor which detects a shift range, and a signal from an engine rotation speed sensor 14 (see FIG. 3) which detects the rotation speed of the engine 12. The shift range includes, for example, a forward traveling (D) range, a reverse traveling (R) range, and a neutral (N) range. The shift range sensor may detect, for example, the position of the shift lever, or may be a sensor (neutral start switch) which is provided in the transmission 30 and detects the position of a member moved to a position corresponding to a shift range selected according to the operation of the shift lever.

The HV-ECU 70 further receives a signal from a MG1 rotation speed sensor 27 (see FIG. 3) which detects a rotation speed Nm1 of a motor generator MG1 (described below) included in the differential unit 20, a signal from an MG2 rotation speed sensor 28 (see FIG. 3) which detects a rotation speed Nm2 of a motor generator MG2 (described below) included in the differential unit 20, and a signal from an oil temperature sensor which detects the temperature (oil temperature) of hydraulic oil of the differential unit 20 and the transmission 30. Furthermore, the HV-ECU 70 receives a signal indicating the SOC value of the power storage device 54 from the battery ECU 66.

The ECT-ECU 68 receives a signal from an output shaft rotation speed sensor 37 (see FIG. 3) which detects a rotation speed (hereinafter, referred to as an output shaft rotation speed) No of the output shaft of the transmission 30.

The engine ECU 62 generates a throttle signal, an ignition signal, a fuel injection signal, and the like for driving the engine 12 and outputs the generated signals to the engine 12. The MG-ECU 64 generates an MG1 current command value and an MG2 current command value for driving the motor generators MG1, MG2 by the inverter 52 and outputs the MG1 current command value and the MG2 current command value to the inverter 52. The ECT-ECU 68 generates a hydraulic pressure command such that the transmission 30 has the torque capacity corresponding to a torque capacity command Tcr and outputs the hydraulic pressure command to the transmission 30.

Figure 3:
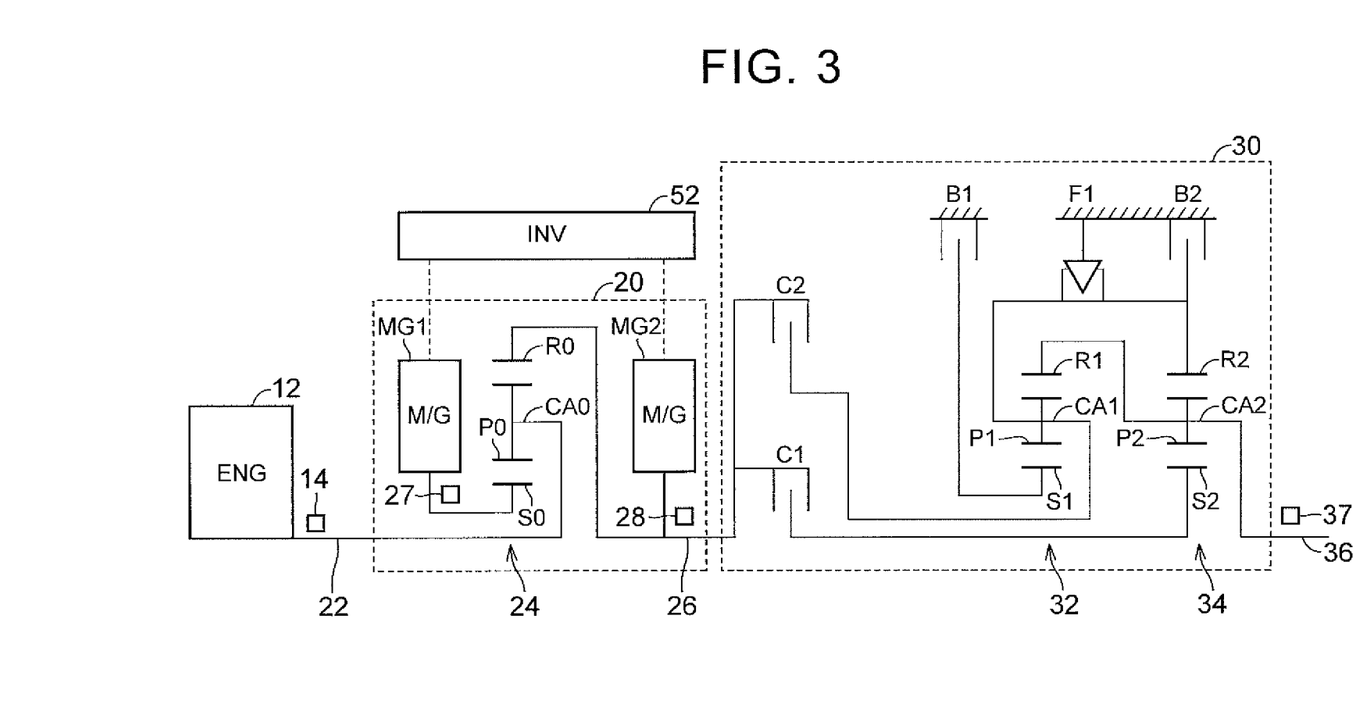
FIG. 3 is a diagram showing the configuration of a differential unit and a transmission.

FIG. 3 is a diagram showing the configuration of the differential unit 20 and the transmission 30 shown in FIG. 1. In this embodiment, the differential unit 20 and the transmission 30 are constituted symmetrically with respect to the axes, and thus, in FIG. 3, the lower sides of the differential unit 20 and the transmission 30 are not shown.

Referring to FIG. 3, the differential unit 20 includes the motor generators MG1, MG2, and a power split device 24. Each of the motor generators MG1, MG2 is an AC motor, and is constituted of, for example, a permanent magnet synchronous motor which includes a rotor with permanent magnets embedded therein. The motor generators MG1, MG2 are driven by the inverter 52.

The motor generator MG1 is provided with the MG1 rotation speed sensor 27 which detects the rotation speed of the rotating shaft of the motor generator MG1. The motor generator MG2 is provided with the MG2 rotation speed sensor 28 which detects the motor rotation speed Nm2.

The power split device 24 is constituted of a single pinion type planetary gear, and includes a sun gear S0, a pinion gear P0, a carrier CA0, and a ring gear R0. The carrier CA0 is coupled to an input shaft 22, that is, the output shaft of the engine 12 and supports the pinion gear P0 in rotatable and revolvable manners. The output shaft of the engine 12 is provided with the engine rotation speed sensor 14 which detects the engine rotation speed.

The sun gear S0 is coupled to the rotating shaft of the motor generator MG1. The ring gear R0 is coupled to a transmission member 26 and is configured to mesh with the sun gear S0 through the pinion gear P0. The transmission member 26 is coupled with the rotating shaft of the motor generator MG2. That is, the ring gear R0 is also coupled to the rotating shaft of the motor generator MG2.

Figure 5:
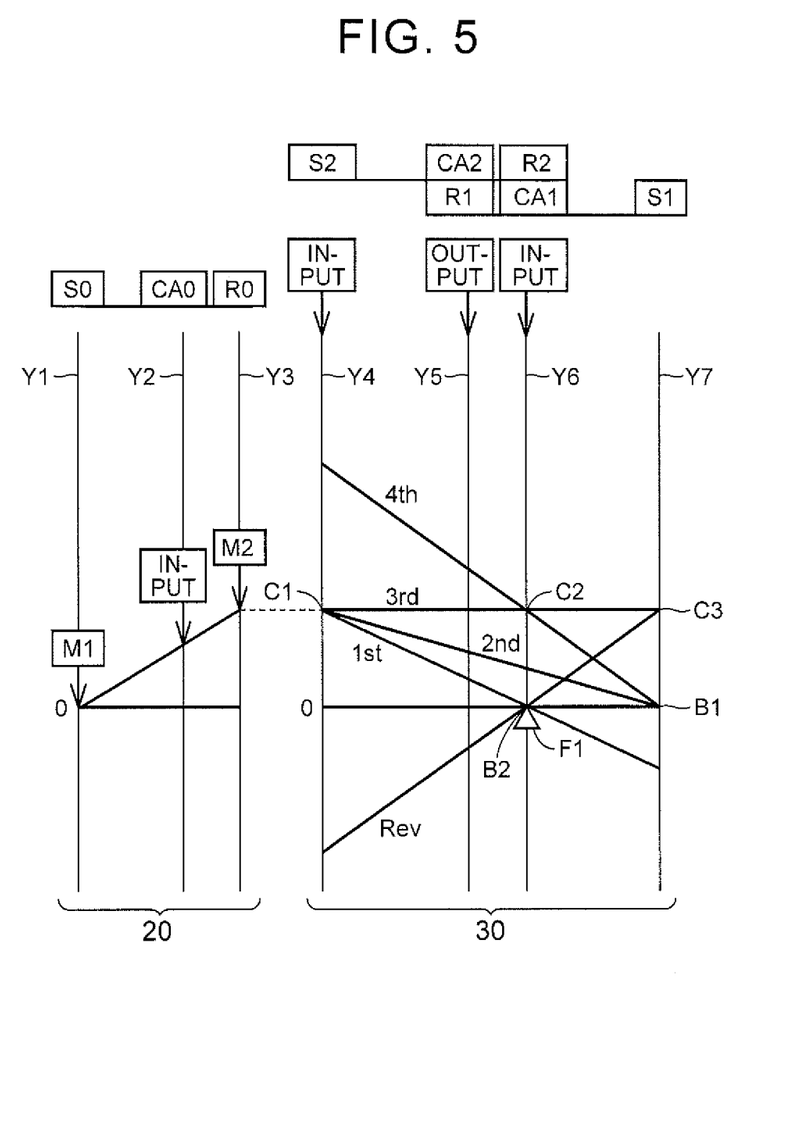
FIG. 5 is a nomographic chart of a transmission unit having a differential unit and a transmission.

The power split device 24 functions as a differential device by the relative rotation of the sun gear S0, the carrier CA0, and the ring gear R0. The rotation speeds of the sun gear S0, the carrier CA0, and the ring gear R0 have a relationship in which the rotation speeds of the respective gears are connected by straight lines in a nomographic chart as described below (FIG. 5). That is, if the rotation speeds of two rotating elements among the three rotating elements (the sun gear S0, the carrier CA0, and the ring gear R0) in the planetary gear are determined, the rotation speed of the remaining one rotating element is determined. Power output from the engine 12 is distributed to the sun gear S0 and the ring gear R0 by the differential function of the power split device 24. The motor generator MG1 operates as a generator (it is rotated to generate electric power) with power distributed to it from the sun gear S0, and electric power generated by the motor generator MG1 is supplied to the motor generator MG2 or is stored in the power storage device 54 (FIG. 1). The motor generator MG1 generates electric power by being rotated with power split to it by the power split device 24, or the motor generator MG2 is driven with electric power supplied to it and generated by the motor generator MG1, whereby the differential unit 20 can realize a gear shift function.

The transmission 30 includes single pinion type planetary gears 32, 34, clutches C1, C2, brakes B1, B2, and a one-way clutch F1. The planetary gear 32 includes a sun gear S1, a pinion gear P1, a carrier CA1, and a ring gear R1. The planetary gear 34 includes a sun gear S2, a pinion gear P2, a carrier CA2, and a ring gear R2.

Each of the clutches C1, C2 and the brakes B1, B2 is a friction engagement device which is hydraulically operated, and is constituted of wet type multiple disks in which stacked multiple friction plates are pressed against one another by hydraulic pressure, band brakes in which one end of a band wrapped around the outer peripheral surface of a rotating drum is tightened by hydraulic pressure, and the like. The one-way clutch F1 supports the carrier CA1 and the ring gear R2 coupled with each other in a rotatable manner in one direction and in an unrotatable manner in the other direction.

Figure 4:
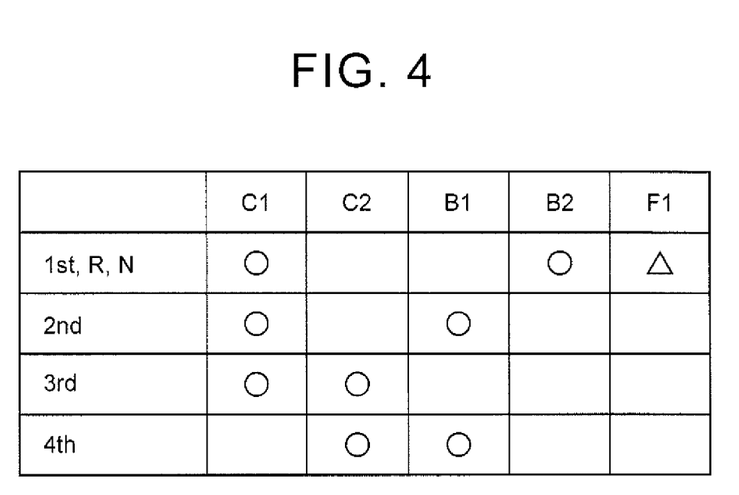
FIG. 4 is a diagram showing an engagement operation table of the transmission.

In the transmission 30, the engagement devices including the clutches C1, C2 and the brakes B1, B2, and the one-way clutch F1 are engaged with one another according to the engagement operation table shown in FIG. 4, whereby a first-speed gear stage to a fourth-speed gear stage and a reverse gear stage are selectively formed. In FIG. 4, "○" indicates an engagement state, "Δ" indicates that the components are engaged only in driving, and a blank indicates a disengagement state. In this embodiment, in a case where the N range is selected as the shift range and the charging of the power storage device 54 is not executed, in the transmission 30, similarly to the first-speed gear stage, the clutch C1 and the brake B2 are brought into the engagement state and the torque output of the motor generators MG1, MG2 is stopped. The torque output of the motor generators MG1, MG2 is stopped, whereby the neutral state (power shut-off state) is formed.

In a case where the N range is selected as the shift range and the charging of the power storage device 54 is executed, in the transmission 30, the clutch C1 is brought into the disengagement state, whereby the neutral state (power transmission shut-off state) is formed. In a case where the charging of the power storage device 54 is executed, the engine 12 is brought into the operation state, and negative torque is generated in the motor generators MG1, MG2, whereby a power generation operation is performed. At this time, the engagement state of the brake B2 is maintained.

Referring to FIG. 3 again, the differential unit 20 and the transmission 30 are coupled by the transmission member 26. An output shaft 36 coupled to the carrier CA2 of the planetary gear 34 is coupled to the differential gear device 42 (FIG. 1). The output shaft 36 of the transmission 30 is coupled with the output shaft rotation speed sensor 37 which detects the output shaft rotation speed No.

FIG. 5 is a nomographic chart of the transmission unit 15 having the differential unit 20 and the transmission 30. Referring to FIG. 3 along with FIG. 5, a vertical line Y1 in the nomographic chart corresponding to the differential unit 20 indicates the rotation speed of the sun gear S0 of the power split device 24, that is, the rotation speed of the motor generator MG1. A vertical line Y2 indicates the rotation speed of the carrier CA0 of the power split device 24, that is, the rotation speed of the engine 12. A vertical line Y3 indicates the rotation speed of the ring gear R0 of the power split device 24, that is, the rotation speed of the motor generator MG2. The spacing among the vertical lines Y1 to Y3 is determined according to the gear ratio of the power split device 24.

A vertical line Y4 in the nomographic chart corresponding to the transmission 30 indicates the rotation speed of the sun gear S2 of the planetary gear 34, and a vertical line Y5 indicates the rotation speed of the carrier CA2 of the planetary gear 34 and the ring gear R1 of the planetary gear 32 coupled with each other. A vertical line Y6 indicates the rotation speed of the ring gear R2 of the planetary gear 34 and the carrier CA1 of the planetary gear 32 coupled with each other, and a vertical line Y7 indicates the rotation speed of the sun gear S1 of the planetary gear 32. The spacing among the vertical lines Y4 to Y7 is determined according to the gear ratio of the planetary gears 32, 34.

If the clutch C1 is engaged, the ring gear R0 of the differential unit 20 is coupled with the sun gear 52 of the planetary gear 34, and the sun gear 52 rotates at the same speed as the ring gear R0. If the clutch C2 is engaged, the ring gear R0 is coupled with the carrier CA1 of the planetary gear 32 and the ring gear R2 of the planetary gear 34, and the carrier CA1 and the ring gear R2 rotate at the same speed as the ring gear R0. If the brake B1 is engaged, the rotation of the sun gear S1 is stopped, and if the brake B2 is engaged, the rotation of the carrier CA1 and the ring gear R2 is stopped.

For example, as shown in the engagement operation table of FIG. 4, if the clutch C1 and the brake B1 are engaged and other clutches and brakes are disengaged, the nomographic chart of the transmission 30 is plotted as a straight line indicated by "2nd". The vertical line Y5 indicating the rotation speed of the carrier CA2 of the planetary gear 34 indicates the output rotation speed (the rotation speed of the output shaft 36) of the transmission 30. In this way, in the transmission 30, the clutches C1, C2 and the brakes B1, B2 are engaged or disengaged according to the engagement operation table of FIG. 4, whereby it is possible to form the first-speed gear stage to the fourth-speed gear stage, the reverse gear stage, and the neutral state.

In the differential unit 20, the rotation of the motor generators MG1, MG2 is appropriately controlled, whereby continuously variable gear shift is realized in which the rotation speed of the ring gear R0, that is, the rotation speed of the transmission member 26 can continuously be changed with respect to the rotation speed of the engine 12 coupled to the carrier CA0. The differential unit 20 is coupled with the transmission 30 which can change the transmission gear ratio between the transmission member 26 and the output shaft 36, whereby it is possible to reduce the transmission gear ratio of the differential unit 20 while obtaining a continuously variable gear shift function by the differential unit 20, and to reduce the loss in the motor generators MG1, MG2.

In the vehicle 10 having the above configuration, for example, a case where the shift range is the N range and the charging of the power storage device 54 is executed will be described. In this case, in a case where the engine 12 is started using the motor generators MG1, MG2 in a state where the neutral state of the transmission 30 is not established due to failure of the transmission 30 (specifically, failure of the clutch C1), motor torque may be transmitted to the drive wheel 44 through the transmission 30. For this reason, vibration, noise, or the like may occur in the vehicle 10. In contrast, a case where it is determined whether or not the neutral state of the transmission 30 is established using the sensor which detects the state of the clutch C1 may be considered, but the number of components may increase and manufacturing costs may increase.

Accordingly, in this embodiment, in a case where the clutch C1 is controlled so as to be brought into the neutral state and the motor generator MG2 is controlled to output torque, when the rotation speed difference between the input shaft (the transmission member 26) and the output shaft 36 of the transmission 30 is smaller than the rotation speed difference when the neutral state is established, the control device 60 suppresses the cranking of the engine 12 using the motor generators MG1, MG2. In this embodiment, the control device 60 performs this control in a case where the shift range is the N range and the charging of the power storage device 54 is executed. The state where the neutral state is established refers to a state where the clutch C1 is in the disengagement state, and thus, power transmission between the input shaft (the transmission member 26) and the output shaft 36 of the transmission 30 is shut off. The state where the neutral state is not established refers to a state where the clutch C1 is not in the disengagement state (half-engagement state or engagement state), and thus, power can be transmitted between the input shaft (the transmission member 26) and the output shaft 36 of the transmission 30.

With this, it is possible to prevent the transmission of torque of the motor generators MG1, MG2 to the output shaft of the transmission 30 due to the cranking of the engine 12 when the clutch C1 is abnormal. In addition, it is not necessary to provide a sensor which detects the state of the clutch C1 in order to determine whether or not the neutral state is established with high accuracy, and thus, it is possible to minimize an increase in the number of components and increases in manufacturing costs.

Figure 6:
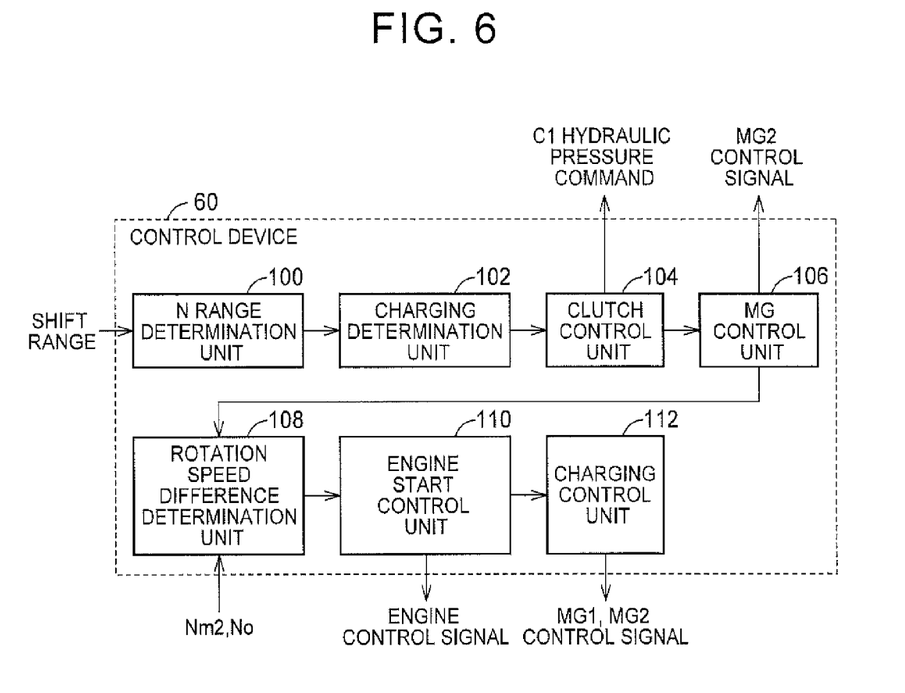
FIG. 6 is a functional block diagram of the control device.

FIG. 6 is a functional block diagram of the control device 60 provided in the vehicle 10 according to this embodiment. The control device 60 includes an N range determination unit 100, a charging determination unit 102, a clutch control unit 104, an MG control unit 106, a rotation speed difference determination unit 108, an engine start control unit 110, and a charging control unit 112. The configurations of these units may be realized by software, such as programs, or may be realized by hardware.

The N range determination unit 100 determines whether or not the shift range is the N range based on the signal from the shift range sensor.

The charging determination unit 102 determines whether or not the charging of the power storage device 54 is required in a case where the N range determination unit 100 determines that the shift range is the N range. Specifically, the charging determination unit 102 determines that the charging of the power storage device 54 is required in a case where the SOC of the power storage device 54 is smaller than a threshold SOC (0). The threshold SOC (0) is a value higher than a lower limit value of the SOC of the power storage device 54, and is set so as not to reach the lower limit value of the SOC even if control for operating the motor generator MG2 and control for starting the engine 12 described below are executed.

The clutch control unit 104 controls the clutch C1 such that the clutch C1 is in the disengagement state in a case where the charging determination unit 102 determines that the charging of the power storage device 54 is required. Specifically, the clutch control unit 104 generates a C1 hydraulic pressure command to make the hydraulic pressure of the clutch C1 zero and outputs the C1 hydraulic pressure command to a hydraulic pressure circuit of the transmission 30.

The MG control unit 106 executes control processing for generating prescribed torque in the motor generator MG2 after the control of the clutch C1 is started by the clutch control unit 104. The prescribed torque is, for example, torque which is rolling resistance of the vehicle 10 even in a case where the clutch C1 is not in the disengagement state. The prescribed torque may be at least an amount of torque such that the movement of the vehicle 10 is suppressed. The MG control unit 106 starts the control of the motor generator MG2 when a standby time $\Delta t$ elapses after the control of the clutch C1 is started. The standby time $\Delta t$ is, for example, a time from when the control of the clutch C1 is started until the actual hydraulic pressure of the clutch C1 becomes zero, or a time longer than this time, and is set, for example, based on the oil temperature. The viscosity of hydraulic oil supplied to the clutch C1 in a case where the oil temperature is low is greater than viscosity in a case where the oil temperature is high. For this reason, for example, a standby time in a case where the oil temperature is low is longer than a standby time in a case where the oil temperature is high.

The rotation speed difference determination unit 108 determines whether or not the magnitude (absolute value) of the rotation speed difference between the input shaft rotation speed of the transmission 30 and the output shaft rotation speed No of the transmission 30 is greater than a threshold $\alpha$ during the execution of the control processing by the MG control unit 106.

As shown in FIG. 3, the input shaft rotation speed of the transmission 30 is the same as the rotation speed Nm2 of the motor generator MG2. For this reason, the rotation speed difference determination unit 108 calculates the difference between the rotation speed Nm2 of the motor generator MG2 detected by the MG2 rotation speed sensor 28 and the output shaft rotation speed No detected by the output shaft rotation speed sensor 37 as the rotation speed difference. The rotation speed difference determination unit 108 determines whether or not the magnitude of the calculated rotation speed difference is greater than the threshold $\alpha$.

The threshold $\alpha$ is set to a value which is equal to or less than the rotation speed difference generated when the control processing is executed in a state where the neutral state is established (that is, in a state where the clutch C1 is disengaged). The threshold $\alpha$ is set to a value which is greater than a maximum value of the rotation speed difference when the control processing is executed in a state where the neutral state is not established (that is, in a state where the clutch C1 is not disengaged).

That is, the threshold $\alpha$ is the threshold for determining whether or not the calculated rotation speed difference is smaller than the rotation speed difference when the neutral state is established and the control processing is executed.

The engine start control unit 110 executes engine start processing in a case where the rotation speed difference determination unit 108 determines that the magnitude of the calculated rotation speed difference is greater than the threshold $\alpha$.

Specifically, the engine start control unit 110 performs the cranking of the engine 12 by rotating the output shaft of the engine 12 using torque in the positive rotation direction of the motor generator MG1. In this case, a reaction force to the torque of the motor generator MG1 needs to act in the ring gear R0. For this reason, the engine start control unit 110 generates torque in the positive rotation direction in the motor generator MG1 and generates torque in the positive rotation direction in the motor generator MG2 (to supply the reaction force).

The engine start control unit 110 generates torque in the motor generator MG2, for example, such that the rotation speed Nm2 of the motor generator MG2 is maintained. The engine start control unit 110 increases the rotation speed of the engine 12 by increasing the rotation speed of the sun gear S0 by torque of the motor generator MG1 (that is, performs the cranking of the engine 12). The engine start control unit 110 starts the engine 12 by executing fuel injection control and ignition control when the rotation speed of the engine 12 increases to an initial explosion rotation speed range.

The engine start control unit 110 inhibits the start of the engine 12 in a case where the rotation speed difference determination unit 108 determines that the magnitude of the calculated rotation speed difference is equal to or less than the threshold α. For example, the engine start control unit 110 sets a start inhibition flag in an on state to prevent the start of the engine 12 to a subsequent start request of the engine 12.

The charging control unit 112 controls the motor generators MG1, MG2 such that torque in a negative rotation direction (negative torque) is generated in the motor generators MG1, MG2 after the engine 12 is started by the operation of the engine start control unit 110. With this, the power generation operation is performed in the motor generators MG1, MG2. Electric power generated by the power generation operation is supplied to the power storage device 54 through the inverter 52. With this, the charging of the power storage device 54 is performed.

Figure 7:
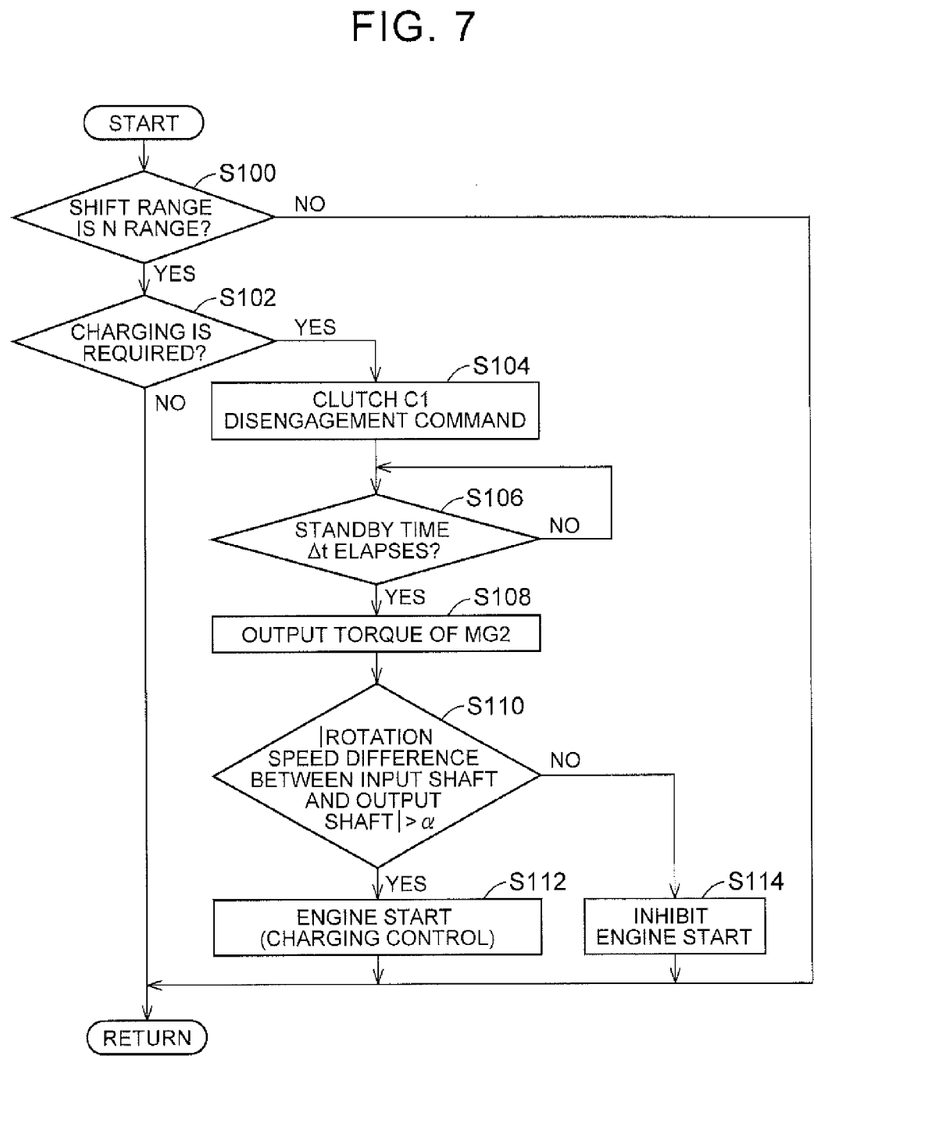
FIG. 7 is a flowchart showing control processing which is executed in the control device.

Referring to FIG. 7, the control processing which is executed in the control device 60 mounted in the vehicle 10 according to this embodiment will be described.

In S100 (Step is referred to as S), the control device 60 determines whether or not the shift range is the N range. In a case where it is determined that the shift range is the N range (in S100, YES), the process progresses to S102. Otherwise (in S100, NO), the process ends.

In S102, the control device 60 determines whether or not the charging of the power storage device 54 is required. In a case where it is determined that the charging of the power storage device 54 is required (in S102, YES), the process progresses to S104. Otherwise (in S102, NO), the process ends.

In S104, the control device 60 outputs the C1 hydraulic pressure command to make the hydraulic pressure zero such that the clutch C1 is in the disengagement state.

In S106, the control device 60 determines whether or not the standby time Δt elapsed after the output of the C1 hydraulic pressure command is started. In a case where it is determined that the standby time Δt elapses after the output of the C1 hydraulic pressure command is started (in S106, YES), the process progresses to S108. Otherwise (in S106, NO), the process returns to S106.

In S108, the control device 60 controls the motor generator MG2 such that prescribed torque is generated.

In S110, the control device 60 determines whether or not the magnitude of the rotation speed difference between the input shaft rotation speed of the transmission 30 and the output shaft rotation speed of the transmission 30 is greater than the threshold α. In a case where it is determined that the magnitude of the rotation speed difference is greater than the threshold α (in S110, YES), the process progresses to S112. Otherwise (in S110, NO), the process progresses to S114.

In S112, the control device 60 executes the engine start processing for starting the engine 12 to start the engine 12, and then, executes the charging control for charging the power storage device 54. In S114, the control device 60 inhibits the start of the engine 12.

The operation of the control device 60 provided in the vehicle 10 according to this embodiment based on the above-described structure and flowchart will be described referring to FIGS. 8 and 9.

Figure 8:
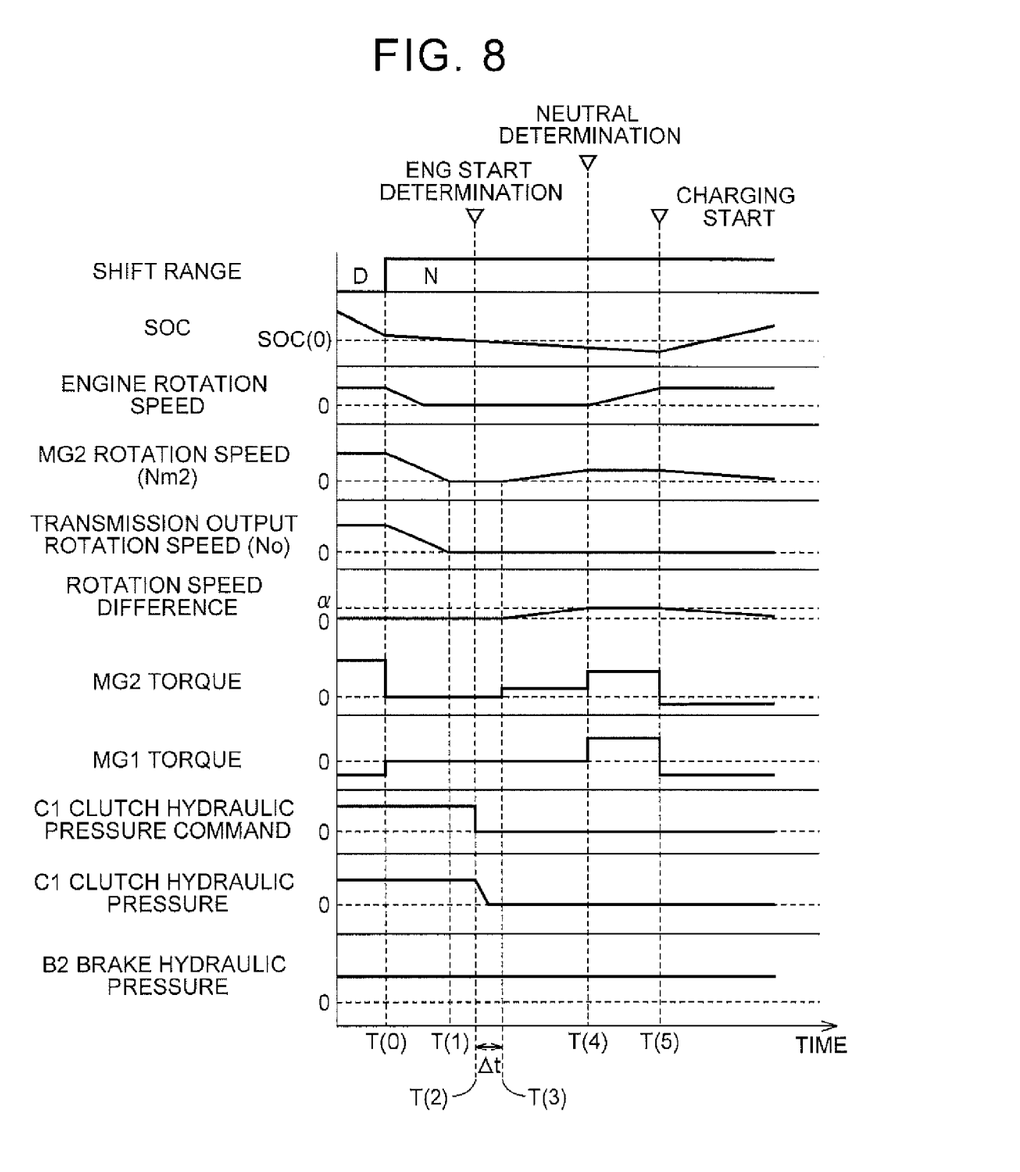
FIG. 8 is a timing chart illustrating the operation of the control device when the clutch is normal.
Figure 9:
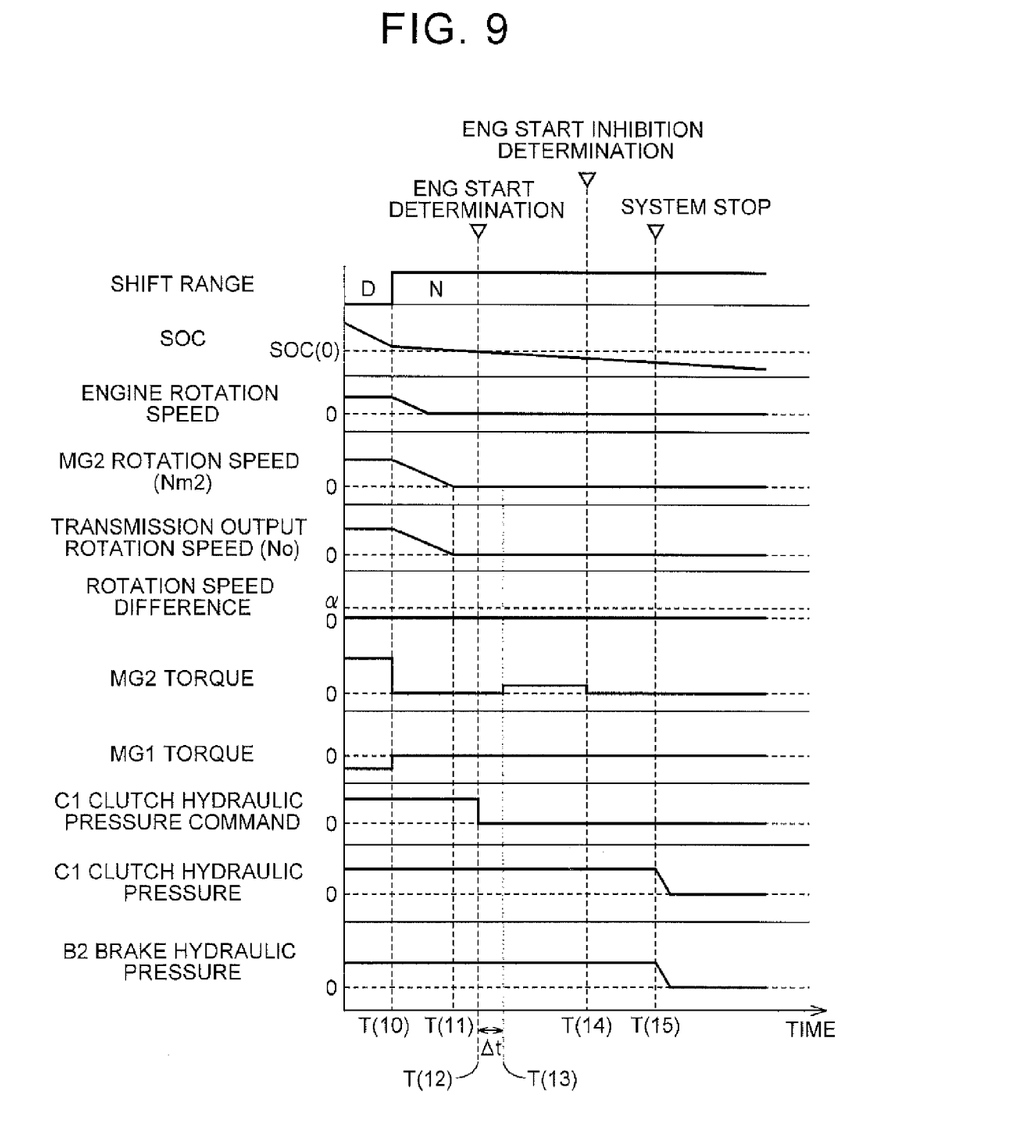
FIG. 9 is a timing chart illustrating the operation of the control device when the clutch is abnormal.

In FIGS. 8 and 9, the horizontal axis indicates the time. In FIGS. 8 and 9, the various horizontal lines indicate the shift range, the SOC, the engine rotation speed, the rotation speed Nm2 of the motor generator MG2, the output shaft rotation speed No of the transmission 30, the rotation speed difference, the torque of the motor generator MG2, the torque of the motor generator MG1, the hydraulic pressure command value of the clutch C1, the actual hydraulic pressure of the clutch C1, and the actual hydraulic pressure of the brake B2. In FIGS. 8 and 9, the rotation speed Nm1 of the motor generator MG1 is not shown.

<When the clutch C1 is normal> Referring to FIG. 8, a case where the shift range is the D range is assumed. A case where the SOC is greater than the threshold SOC (0) and the engine 12 is operating is assumed. In addition, it is assumed that the vehicle 10 is traveling with power of the engine 12 and the motor generator MG2, and both of the clutch C1 and the brake B2 are in the engagement state, whereby the first-speed gear stage is formed in the transmission 30.

In this case, at the time T(0), if the shift range is switched from the D range to the N range (in S100, YES), the torque output of the motor generators MG1, MG2 is stopped, and the operation of the engine 12 is stopped; thus, all of the rotation speeds Nm1, Nm2 of the motor generators MG1, MG2 and the rotation speed of the engine 12 decrease over time after the time T(0). The vehicle 10 is in a coasting state, and the vehicle speed (output shaft rotation speed No) decreases over time due to traveling resistance, the brake operation of the driver, or the like.

At the time T(1), the output shaft rotation speed No of the transmission 30 becomes zero, and the vehicle 10 is stopped.

At the time T(2), if the SOC of the power storage device 54 is lower than the threshold SOC (0) and it is determined that the charging of the power storage device 54 is required (in S102, YES), the C1 hydraulic pressure command to make the hydraulic pressure zero is output (S104). After the C1 hydraulic pressure command is output, the actual hydraulic pressure of the clutch C1 decreases over time.

At the time T(3) when the standby time Δt elapsed after the C1 hydraulic pressure command is output (in S106, YES), the motor generator MG2 is rotated with the prescribed torque (S108). The motor generator MG2 is rotated with the prescribed torque, the rotation speed Nm2 of the motor generator MG2 increases over time after the time T(3).

At the time T(4), if it is determined that the magnitude of the rotation speed difference between the input shaft rotation speed and the output shaft rotation speed of the transmission 30 is greater than the threshold α (in S110, YES), since the power transmission shut-off state is established in the transmission 30, the start control of the engine 12 is executed (S112). That is, torque is made to act on the sun gear S0 using the motor generator MG1 while increasing the torque of both of the motor generators MG1, MG2 and generating reaction torque in the ring gear R0 using the motor generator MG2, whereby the rotation speed of the engine 12 increases.

At the time T(5), if the rotation speed of the engine 12 increases to the initial explosion rotation speed, the ignition control and the fuel injection control are executed, whereby the engine 12 starts. The engine 12 starts and negative torque is generated in the motor generators MG1, MG2, whereby the power generation operation is performed. Electric power generated in the motor generators MG1, MG2 is supplied to the power storage device 54. With this, the charging of the power storage device 54 is performed. The charging of the power storage device 54 is started, whereby the SOC of the power storage device 54 increases over time.

<When the clutch C1 is abnormal> Referring to FIG. 9, a case where the shift range is the D range is assumed. A case where the SOC is greater than the threshold SOC (0) and the engine 12 is in operation is assumed. In addition, it is assumed that the vehicle 10 is traveling with power of the engine 12 and the motor generator MG2, and both of the clutch C1 and the brake B2 are in the engagement state, whereby the first-speed gear stage is formed in the transmission 30.

In this case, at the time T(10), if the shift range is switched from the D range to the N range (in S100, YES), the torque output of the motor generators MG1, MG2 is stopped, and the operation of the engine 12 is stopped; thus, all of the rotation speeds Nm1, Nm2 of the motor generators MG1, MG2 and the rotation speed of the engine 12 decrease over time after the time T(10). The vehicle 10 is in a coasting state, and the vehicle speed (output shaft rotation speed No) decreases over time due to traveling resistance, the brake operation of the driver, or the like.

At the time T(11), the output shaft rotation speed of the transmission 30 becomes zero, and the vehicle 10 is stopped.

At the time T(12), if the SOC of the power storage device 54 is lower than the threshold SOC (0) and it is determined that the charging of the power storage device 54 is required (in S102, YES), the C1 hydraulic pressure command to make the hydraulic pressure zero is output (S104). After the C1 hydraulic pressure command is output, when the clutch C1 is abnormal, the actual hydraulic pressure of the clutch C1 is maintained even after the C1 hydraulic pressure command is output.

At the time T(13) when the standby time Δt elapsed after the C1 hydraulic pressure command is output (in S106, YES), the prescribed torque is generated in the rotating shaft of the motor generator MG2 (S108).

In a case where the actual hydraulic pressure of the clutch C1 does not decrease due to abnormality, the engagement state of the clutch C1 is maintained. For this reason, the rotation resistance of the input shaft of the transmission 30 is greater than the rotation resistance of the input shaft when the clutch C1 is normal (that is, in a case where the clutch C1 is in the disengagement state). In a case of generating torque in the motor generator MG2, power is transmitted to the output shaft of the transmission 30. The torque generated in the motor generator MG2 is torque such that the movement of the vehicle 10 is restricted even in a case where the clutch C1 is in the engagement state, and is smaller than the rotation resistance of the input shaft of the transmission 30 in a case where the clutch C1 is abnormal (that is, in a case where the clutch C1 is in the engagement state). For this reason, even if the torque of the motor generator MG2 is transmitted to the output shaft of the transmission 30, both of the output shaft rotation speed No of the transmission 30 and the rotation speed Nm2 of the motor generator MG2 become zero.

At the time T(14), if it is determined that the magnitude of the rotation speed difference between the input shaft rotation speed and the output shaft rotation speed of the transmission 30 is equal to or less than the threshold α (in S110, NO), the start of the engine 12 is inhibited (S114). For this reason, the torque output of the motor generator MG2 is stopped. At the time T(15), the system of the vehicle 10 is stopped based on a determination result that the clutch C1 is abnormal. As a result, a unit, such as an electric oil pump, which generates hydraulic pressure is stopped, and thus, the actual hydraulic pressure of the clutch C1 and the brake B1 decrease.

As described above, according to the vehicle 10 of this embodiment, in a case where the clutch C1 is controlled so as to be brought into the disengagement state, when the magnitude of the rotation speed difference between the input shaft and the output shaft of the transmission 30 when the motor generator MG2 is rotated is equal to or less than the threshold α, the neutral state is not established in the transmission 30, and thus, the cranking of the engine 12 using the motor generators MG1, MG2 is suppressed. With this, it is possible to prevent the transmission of torque of the motor generators MG1, MG2 to the output shaft of the transmission 30 when the cranking of the engine 12 is performed. As a result, it is possible to suppress the occurrence of vibration or noise. In addition, it is possible to determine whether or not the neutral state is established with high accuracy without separately providing a sensor which detects the state of the clutch C1. Therefore, it is possible to provide a vehicle capable of determining whether or not the power transmission shut-off state of the transmission is established with high accuracy while suppressing increases in costs.

When determining whether or not the neutral state is established, the motor generator MG2 is controlled such that torque which is lower than rolling resistance of the vehicle 10 is generated. For this reason, when controlling the motor generator MG2, even if the neutral state is not established, the movement of the vehicle 10 is suppressed, and the occurrence of vibration or noise can be suppressed.

The operation of the motor generator MG2 is controlled such that the output shaft of the engine 12 rotates in the positive rotation direction. For this reason, it is not necessary to reversely rotate the motor generator MG2 at the time of the cranking of the engine, and thus, it is possible to suppress the occurrence of rattling source or the like of a gear due to reverse rotation.

When the standby time Δt set according to the oil temperature elapses after the control of the clutch C1 so as to be brought into the disengagement state, the control of the motor generator MG2 is started. For this reason, the shaft of the motor generator MG2 is caused to rotate at the timing when it is estimated that the neutral state is established, whereby it is possible to determine whether or not the neutral state is established with high accuracy.

The engagement state of the brake B2 is maintained, whereby it is possible to prevent the calculation of the difference between the rotation speed of the input shaft and the rotation speed of the output shaft of the transmission while in a state where the one-way clutch F1 is rotated in a rotatable direction. For this reason, it is possible to prevent erroneous detection of whether or not the neutral state is established.

Modification examples of this embodiment will be described below. The embodiments are not limited to a case where the input shaft of the transmission 30 is rotated using the motor generator MG2 before the charging of the power storage device 54 while shutting off the clutch C1 at the time of the N range and during stoppage of the vehicle 10. The clutch C1 may be shut off (disengaged) during traveling of the vehicle 10, and the execution of clutch shut-off is not particularly limited to at the time of the N range or during stoppage of the vehicle 10.

The embodiments are not limited to a case where the standby time Δt is calculated based on the oil temperature of the transmission 30. For example, the standby time Δt may be calculated based on the temperature of the motor generators MG1, MG2.

The embodiments are not limited to a case where a sequence of control processing described above is executed in the control device 60. For example, a sequence of control processing described above may be executed in the HV-ECU 70 of the control device 60, may be executed in other ECUs, or may be executed by making a plurality of ECUs cooperate with one another.

The embodiments are not limited to a case where, if the magnitude of the rotation speed difference between the rotation speed of the input shaft and the rotation speed of the output shaft of the transmission 30 is equal to or less than the threshold α, the start of the engine 12 is inhibited. For example, the start of the engine 12 may be suppressed when there is a request to start the engine 12 on an assumption that the clutch C1 is in the shut-off state, and thereafter, in a case where a request to start the engine 12 on an assumption that the clutch C1 is in the engagement state is received, the start of the engine 12 may be performed.

The embodiments are not limited to a configuration in which the differential unit 20 is coupled to the input shaft of the transmission 30, and the motor generators MG1, MG2 and the engine 12 are coupled through the power split device 24 in the differential unit 20. For example, the input shaft of the transmission 30 may be coupled with the rotating shaft of a motor generator, and the rotating shaft of the motor generator may be coupled with the output shaft of the engine through the clutch.

The embodiments are not limited to a configuration in which the rotating shaft of the motor generator MG1 is connected to the sun gear S0 of the planetary gear constituting the power split device 24, the output shaft of the engine 12 is connected to the carrier CA0, and the motor generator MG2 is connected to the ring gear R0.

For example, the output shaft of the engine 12 may be connected to one of the sun gear S0, the carrier CA0, and the ring gear R0, and the rotating shaft of the motor generator MG2 may be connected to the sun gear S0, the carrier CA0, and the ring gear R0.

For example, the motor generator MG2 may be connected to the sun gear S0, the engine 12 and the motor generator MG1 may be connected to the ring gear 0 and the input shaft of the transmission 30 may be connected to the carrier CA0.

All or a part of the above-described modification examples may be combined and put into practice. The above-described embodiment is only an example and is not restrictive.

What is claimed is:

1. A vehicle comprising:
an engine;
a first motor generator;
a second motor generator;
a transmission including an input shaft, an output shaft, and a clutch, the input shaft being coupled to the second motor generator, the output shaft being coupled to drive wheels of the vehicle, and the clutch being configured to switch a transmission state of the input shaft to the output shaft between a power transmission state and a power transmission shut-off state;
a differential device including a first rotating element, a second rotating element, and a third rotating element, the first rotating element being coupled to the first motor generator, the second rotating element being coupled to the second motor generator, the third rotating element being coupled to an output shaft of the engine, the differential device being configured such that when rotation speeds of two rotating elements among the first rotating element, the second rotating element, and the third rotating element are determined, a rotation speed of a remaining one of the first, second and third rotating elements is determined; and
an electronic control unit configured to control the first motor generator, the second motor generator, and the clutch, the electronic control unit being configured to (i) detect a rotation speed difference between the input shaft and the output shaft when the clutch is controlled so as to be brought into the power transmission shut-off state, and (ii) when the rotation speed difference detected by the electronic control unit is smaller than a target rotation speed difference between the input shaft and the output shaft that occurs in a case where the power transmission shut-off state of the clutch is established, suppress cranking of the engine by the first motor generator.

2. The vehicle according to claim 1, wherein the electronic control unit is configured to, when the clutch is controlled so as to be brought into the power transmission shut-off state, control the second motor generator so as to generate torque lower than a rolling resistance of the vehicle.

3. The vehicle according to claim 1, wherein the electronic control unit is configured to control the second motor generator such that a shaft of the second motor generator is caused to rotate after a time set according to a temperature of hydraulic oil for use in the clutch has elapsed, after the clutch starts to be controlled so as to be brought into the power transmission shut-off state.

4. The vehicle according to claim 1, wherein the electronic control unit is configured to control the second motor generator so as to output torque such that the output shaft of the engine rotates in a positive rotation direction.

5. The vehicle according to claim 1, wherein
the transmission includes a fourth rotating element, a fifth rotating element, and a sixth rotating element, the transmission is configured such that when rotation speeds of two rotating elements among the fourth rotating element, the fifth rotating element, and the sixth rotating element are determined, a rotation speed of a remaining one of the fourth, fifth and sixth rotating elements is determined,
the fourth rotating element is coupled to the second motor generator through the clutch,
the fifth rotating element is coupled to the output shaft of the transmission,
the sixth rotating element is coupled with a brake which is brought into an engagement state to restrict the rotation of the sixth rotating element and a one-way clutch which restricts the rotation direction of the sixth rotating element to a single direction, and
the electronic control unit is configured to, when the clutch is controlled so as to be brought into the power transmission shut-off state, control the brake so as to be brought into the engagement state.

6. The vehicle according to claim 1, wherein the electronic control unit is configured to, when the rotation speed difference detected by the electronic control unit is equal to or greater than the target rotation speed difference, start the engine by controlling the first motor generator to rotate and thereby crank the engine.

7. The vehicle according to claim 6, wherein the electronic control unit is configured to, when starting the engine by controlling the first motor generator to rotate and thereby crank the engine, control the second motor generator to generate a torque as a reaction force to a cranking torque that is generated by the first motor generator.

8. The vehicle according to claim 7, wherein the torque generated by the second motor generator as the reaction force is greater than a torque generated by the second motor generator when detecting whether the rotation speed difference between the input shaft and the output shaft when the clutch is controlled so as to be brought into the power transmission shut-off state is less than the target rotation speed difference.

* * * * *